US012691803B2

(12) United States Patent
Noguchi et al.

(10) Patent No.: US 12,691,803 B2
(45) Date of Patent: Jul. 28, 2026

(54) VEHICLE SEAT AND VEHICLE

(71) Applicants: TACHI-S CO., LTD., Ome (JP);
Honda Motor Co., Ltd., Tokyo (JP)

(72) Inventors: Yousuke Noguchi, Ome (JP); Motoshi Minegishi, Ome (JP); Tsutomu Hada, Ome (JP); Hiromitsu Nagatomo, Tokyo (JP); Taku Roppongi, Haga-gun (JP); Daisuke Takahashi, Haga-gun (JP)

(73) Assignees: TACHI-S CO., LTD., Tokyo (JP);
HONDA MOTOR CO., LTD., Tokyo (JP)

( * ) Notice: Subject to any disclaimer, the term of this patent is extended or adjusted under 35 U.S.C. 154(b) by 58 days.

(21) Appl. No.: 18/617,711

(22) Filed: Mar. 27, 2024

(65) Prior Publication Data

US 2024/0326670 A1     Oct. 3, 2024

(30) Foreign Application Priority Data

Mar. 27, 2023     (JP) ................................. 2023-049841

(51) Int. Cl.
B60N 2/68          (2006.01)
B60N 2/70          (2006.01)
(52) U.S. Cl.
CPC ............. B60N 2/68 (2013.01); B60N 2/7035 (2013.01)
(58) Field of Classification Search
CPC .............................. B60N 2/7035; B60N 2/646
USPC ....................................... 297/452.27, 452.37
See application file for complete search history.

(56) References Cited

U.S. PATENT DOCUMENTS

| | | | | |
|---|---|---|---|---|
| 8,646,562 | B2 * | 2/2014 | Fukawatase | ......... B60N 2/4235 |
| | | | | 297/452.41 |
| 9,573,503 | B2 * | 2/2017 | Nie | ........................ B60N 2/68 |
| 11,377,008 | B2 * | 7/2022 | Kato | ....................... B60N 2/68 |
| 2016/0059751 | A1 * | 3/2016 | Sahashi | ................. B60N 2/643 |
| | | | | 297/452.21 |

FOREIGN PATENT DOCUMENTS

| | | | | | |
|---|---|---|---|---|---|
| DE | 102010005801 | A1 * | 6/2011 | ............. | B60N 2/986 |
| FR | 3005910 | A1 * | 11/2014 | ............. | B60N 2/986 |
| JP | 2006142743 | A * | 6/2006 | ......... | B29C 44/1214 |
| JP | 2009-297285 | A | 12/2009 | | |
| JP | 2014-128359 | A | 7/2014 | | |
| JP | 2019-022610 | A | 2/2019 | | |
| WO | WO-2009105059 | A1 * | 8/2009 | ............. | B29C 44/60 |
| WO | WO-2024085060 | A1 * | 4/2024 | ........... | B60N 2/7005 |

OTHER PUBLICATIONS

Office Action dated Jun. 23, 2026, issued in counterpart JP Application No. 2023-049841, with English translation. (10 pages).

* cited by examiner

*Primary Examiner* — Richard Green
(74) *Attorney, Agent, or Firm* — WHDA, LLP

(57) ABSTRACT

Since each covering portion (each side frame) is interposed between a first leg portion and a second leg portion of a corresponding one of insert members, even if a relatively large load is applied to side portions of a cushion pad from an occupant, it is possible to restrict deformation of the side portions toward outer sides in left-right directions (rotation of the insert members) by engagement of each support frame with the first and second leg portions. Therefore, it is possible to improve the ability to support an occupant by the side portions.

16 Claims, 5 Drawing Sheets

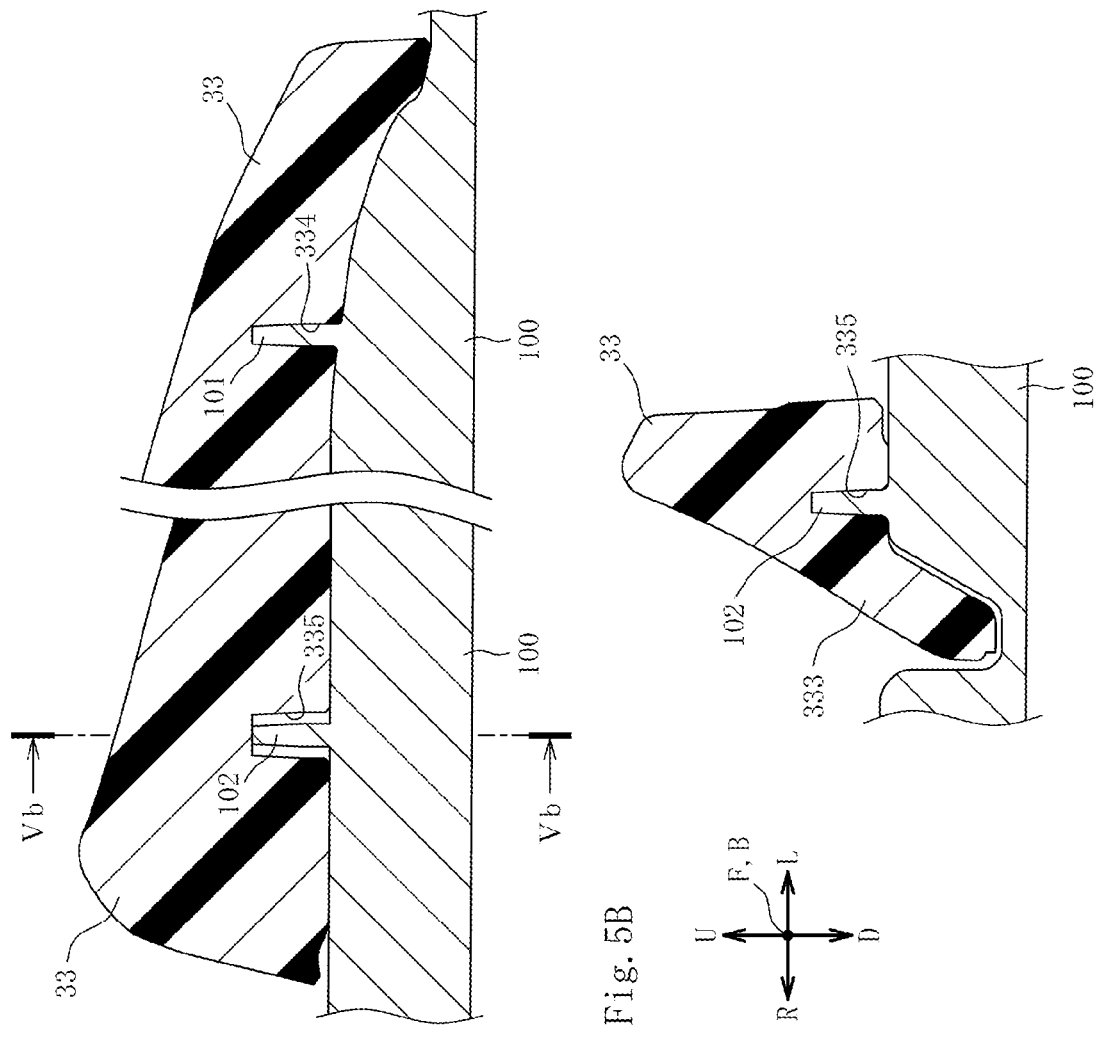
Fig. 5A
Fig. 5B
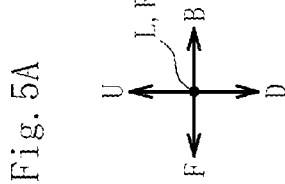

VEHICLE SEAT AND VEHICLE

BACKGROUND OF THE INVENTION

1. Field of the Invention

The present invention relates to a vehicle seat and a vehicle, and, particularly, to a vehicle seat and a vehicle that are capable of improving the ability to support an occupant by side portions.

2. Description of the Related Art

In a cushion pad including a main portion that supports an occupant from below the occupant and side portions that protrude upward from a corresponding one of two end sides of the main portion on a left side and a right side and that support the occupant from the sides of the occupant, there is known a technology that improves the ability to support the occupant by causing the hardnesses of the side portions to be higher than the hardness of the main portion.

For example, Japanese Unexamined Patent Application Publication No. 2009-297285 (for example, paragraphs 0035 and 0045, and FIG. 3) describes a technology of embedding foaming molded bodies 20 (insert members) whose hardnesses are higher than the hardnesses of side support portions 4 (side portions) into the insides of the side support portions 4. According to this technology, since the cores of the side support portions 4 can be hard, it is possible to improve the ability to support an occupant by the side support portions 4.

However, even in the technology of the related art above, when a load that is applied to the side support portions 4 (the side portions) from an occupant is relatively large, the side support portions 4 including the foaming molded bodies 20 deform so as to fall toward outer sides in left-right directions. Therefore, there is a problem that the ability to support the occupant by the side support portions 4 cannot be sufficiently improved.

SUMMARY OF THE INVENTION

The present invention has been made for solving the problems above, and it is an object of the present invention to provide a vehicle seat and a vehicle that are capable of improving the ability to support an occupant by side portions.

To this end, a vehicle seat of the present invention includes a cushion frame that includes two support frames that are left and right support frames and that extend in front-back directions; and a cushion pad that is supported by the cushion frame, in which the cushion pad includes a main portion that constitutes a part of the cushion pad on a central side in left-right directions and that supports an occupant from below the occupant, side portions that are each supported by a corresponding one of the support frames on either a left side or a right side of the main portion and that each protrude upward from the main portion and support the occupant from a side of the occupant, and insert members that are each provided inside a corresponding one of the side portions and whose hardnesses are higher than hardnesses of the side portions, in which each of the insert members includes a first leg portion and a second leg portion, the first leg portions extending toward inner sides of the support frames in the left-right directions, the second leg portions extending toward outer sides of the support frames in the left-right directions, and in which each of the support frames is placed between a corresponding one of the first leg portions and a corresponding one of the second leg portions from a left side and a right side.

According to a vehicle seat of a first aspect and a vehicle of a sixteenth aspect, each of the insert members includes a first leg portion and a second leg portion, the first leg portions extending toward inner sides of the support frames in the left-right directions, the second leg portions extending toward outer sides of the support frames in the left-right directions. Since each of the support frames is placed between a corresponding one of the first leg portions and a corresponding one of the second leg portions from a left side and a right side, even if a relatively large load is applied to the side portions from an occupant, it is possible to restrict deformation of the side portions toward the outer sides in the left-right directions (rotation of the insert members) by engagement of the support frame with the first and second leg portions. Therefore, the effect of making it possible to improve the ability to support an occupant by the side portions is provided.

A vehicle seat of a second aspect provides the following effect in addition to the effect provided by the vehicle seat of the first aspect. Since the first leg portions and the second leg portions, when viewed in the left-right directions, are formed at positions where the first leg portions each overlap a corresponding one of the second leg portions, it is possible to effectively restrict deformation of the side portions toward the outer sides in the left-right directions by engagement of the support frames with the first and second leg portions. Therefore, the effect of making it possible to improve the ability to support an occupant by the side portions is provided.

A vehicle seat of a third aspect provides the following effect in addition to the effect provided by the vehicle seat of the second aspect. Since the first leg portions and the second leg portions are each disposed at substantially a center of a corresponding one of the side portions in the front-back directions, it is possible to dispose the first and second leg portions in regions where a load from an occupant easily acts. Therefore, since it is possible to effectively restrict deformation of the side portions toward the outer sides in the left-right directions by engagement of the support frames with the first and second leg portions, the effect of making it possible to improve the ability to support an occupant by the side portions is provided.

A vehicle seat of a fourth aspect provides the following effect in addition to the effect provided by the vehicle seat of the third aspect. Since each of the second leg portions extends on a forward side with respect to a corresponding one of the first leg portions, for example, in the case where an occupant gets into a vehicle from a doorway, even when a load acting toward inner sides in the left-right directions acts upon the side portions (insert members), the side portions can receive the load as a result of dispersing the load by the second leg portions formed to be relatively long in the front-back directions. Therefore, the effect of making it possible to suppress damage to the second leg portions is provided.

A vehicle seat of a fifth aspect provides the following effect in addition to the effect provided by the vehicle seat of the fourth aspect. Each of the insert members includes a third leg portion that is formed on a forward side with respect to a corresponding one of the second leg portions, the third leg portions extending toward the inner sides of the support frames in the left-right directions. Although a region situated on the forward side with respect to each second leg portion is where a relatively small load acts from an occupant, since the third leg portions protrude toward inner sides in the left-right directions with respect to the first leg portions, the third leg portions are easily pushed against the support frames by the load from the occupant. Therefore, since it is possible to effectively engage the support frames with the first and second leg portions, the effect of making it possible to improve the ability to support the occupant by the side portions is provided.

A vehicle seat of a sixth aspect provides the following effect in addition to the effect provided by the vehicle seat of the first aspect. Each of the insert members has a first insertion hole and a second insertion hole that each receive a protrusion of a die when the cushion pad is molded by the die. Since rotation of the insert members with respect to the die can be restricted by fitting the first and second insertion holes to the protrusions, the first and second leg portions are easily disposed at desired positions (for example, regions where a load of an occupant easily acts). Therefore, since it is possible to effectively restrict deformation of the side portions toward the outer sides in the left-right directions by engagement of the support frames with the first and second leg portions, the effect of making it possible to improve the ability to support the occupant by the side portions is provided.

A vehicle seat of a seventh aspect provides the following effect in addition to the effect provided by the vehicle seat of the sixth aspect. The first leg portions and the second leg portions, when viewed in the left-right directions, are formed at positions where the first leg portions each overlap a corresponding one of the second leg portions, and each of the first insertion holes is formed between a corresponding one of the first leg portions and the corresponding one of the second leg portions. Therefore, even if an error has occurred in a dimension of each insert member in the front-back directions, errors in the relative positions of the first and second leg portions and the first and second insertion holes in the front-back directions are unlikely to occur.

Therefore, even when the protrusions of the die are inserted into the first and second insertion holes, the first and second leg portions are easily disposed at desired positions in the front-back directions. Therefore, since it is possible to effectively restrict deformation of the side portions toward the outer sides in the left-right directions by engagement of the support frames with the first and second leg portions, the effect of making it possible to improve the ability to support an occupant by the side portions is provided.

A vehicle seat of an eighth aspect provides the following effect in addition to the effect provided by the vehicle seat of the seventh aspect. The first insertion holes and the second insertion holes are formed apart from each other in the front-back directions, and the first insertion holes are formed to be capable of restricting relative displacement of the insert members with respect to the protrusions in the front-back directions and the left-right directions when the first insertion holes receive the protrusions. Therefore, since the first and second leg portions are easily disposed at desired positions in the front-back directions and the left-right directions, it is possible to effectively restrict deformation of the side portions toward the outer sides in the left-right directions by engagement of the support frames with the first and second leg portions. Thus, the effect of making it possible to improve the ability to support an occupant by the side portions is provided.

Since, when the second insertion holes receive the protrusions, play in the front-back directions is formed between the second insertion holes and the protrusions, even if an error has occurred in a dimension of each insert member (interval between the first and second insertion holes) in the front-back directions, the effect of making it possible to insert the protrusions of the die into the second insertion holes is provided.

A vehicle seat of a ninth aspect provides the following effect in addition to the effect provided by the vehicle seat of the eighth aspect. The second insertion holes are formed to be capable of restricting relative displacement of the insert members with respect to the protrusions in the left-right directions when the second insertion holes receive the protrusions. Therefore, since the first and second leg portions are easily disposed at desired positions in the left-right directions, it is possible to effectively restrict deformation of the side portions toward the outer sides in the left-right directions by engagement of the support frames with the first and second leg portions. Thus, the effect of making it possible to improve the ability to support an occupant by the side portions is provided.

A vehicle seat of a tenth aspect provides the following effect in addition to the effect provided by the vehicle seat of the ninth aspect. Each of the insert members includes a third leg portion that is formed on a forward side with respect to a corresponding one of the second leg portions, the third leg portions extending toward the inner sides of the support frames in the left-right directions. Since the second insertion holes are formed at positions where the second insertion holes are disposed side by side with the third leg portions in the left-right directions, the third leg portions are easily disposed at desired positions in the left-right directions. Therefore, since the third leg portions are easily pushed against the support frames by the load from an occupant, it is possible to effectively restrict deformation of the side portions toward the outer sides in the left-right directions by engagement of the support frames with the first to third leg portions. Thus, the effect of making it possible to improve the ability to support the occupant by the side portions is provided.

A vehicle seat of an eleventh aspect provides the following effect in addition to the effect provided by the vehicle seat of the first aspect. Since only the insert member at the side portion adjacent to the doorway is provided with the second leg portion and the insert member at the side portion on a side opposite thereto (central side of the vehicle in the width direction) is not provided with the second leg portion, the effect of making it possible to suppress arrangement of vehicle components provided on the central side of the vehicle in the width direction from being restricted is provided.

A vehicle seat of a twelfth aspect provides the following effect in addition to the effect provided by the vehicle seat of the first aspect. Side surfaces of the insert members that face inner sides in the left-right directions each have an inclined surface, the inclined surfaces being inclined downward toward the inner sides of the support frames in the left-right directions from an upper end side to a lower end side thereof. Since the inclined surfaces have curved shapes that are recessed toward the outer sides of the support frames in the left-right directions, the thighs of an occupant are easily supported by the inclined surfaces having such curved forms. Therefore, the effect of making it possible to improve the ability to support the occupant by the side portions is provided.

A vehicle seat of a thirteenth aspect provides the following effect in addition to the effect provided by the vehicle seat of the twelfth aspect. Since each of the insert members includes a third leg portion that is formed on a forward side with respect to a corresponding one of the first leg portions, the third leg portions extending toward the inner sides of the support frames in the left-right directions, and since each of the inclined surfaces extends in the front-back directions from a region where a corresponding one of the first leg portions is formed to a region where a corresponding one of the third leg portions is formed, the support frames and the first to third leg portions easily engage with one another by the load from an occupant. Therefore, the effect of making it possible to restrict deformation of the side portions toward the outer sides in the left-right directions is provided.

A vehicle seat of a fourteenth aspect provides the following effect in addition to the effect provided by the vehicle seat of the first aspect. Each of the second leg portions extends on a forward side with respect to a corresponding one of the first leg portions, and each of the insert members includes a third leg portion that is formed on a forward side with respect to a corresponding one of the second leg portions, the third leg portions extending toward the inner sides of the support frames in the left-right directions. Therefore, since the first to third leg portions engage the support frames at positions that are displaced from each other in the front-back directions, the effect of making it possible to restrict deformation of the side portions toward the outer sides in the left-right directions is provided.

A vehicle seat of a fifteenth aspect provides the following effect in addition to the effect provided by the vehicle seat of the first aspect. Since hardnesses of the side portions are higher than a hardness of the main portion and hardnesses of the insert members are higher than the hardnesses of the side portions, it is possible to effectively restrict deformation of the side portions toward the outer sides in the left-right directions. Thus, the effect of making it possible to improve the ability to support an occupant by the side portions is provided.

BRIEF DESCRIPTION OF THE DRAWINGS

FIG. 5A is a partial enlarged sectional view of a lower die, showing a state in which the insert member is fixed, and FIG. 5B is a partial enlarged sectional view of the lower die along line Vb-Vb in FIG. 5A.

DESCRIPTION OF THE PREFERRED EMBODIMENTS

Figure 1:
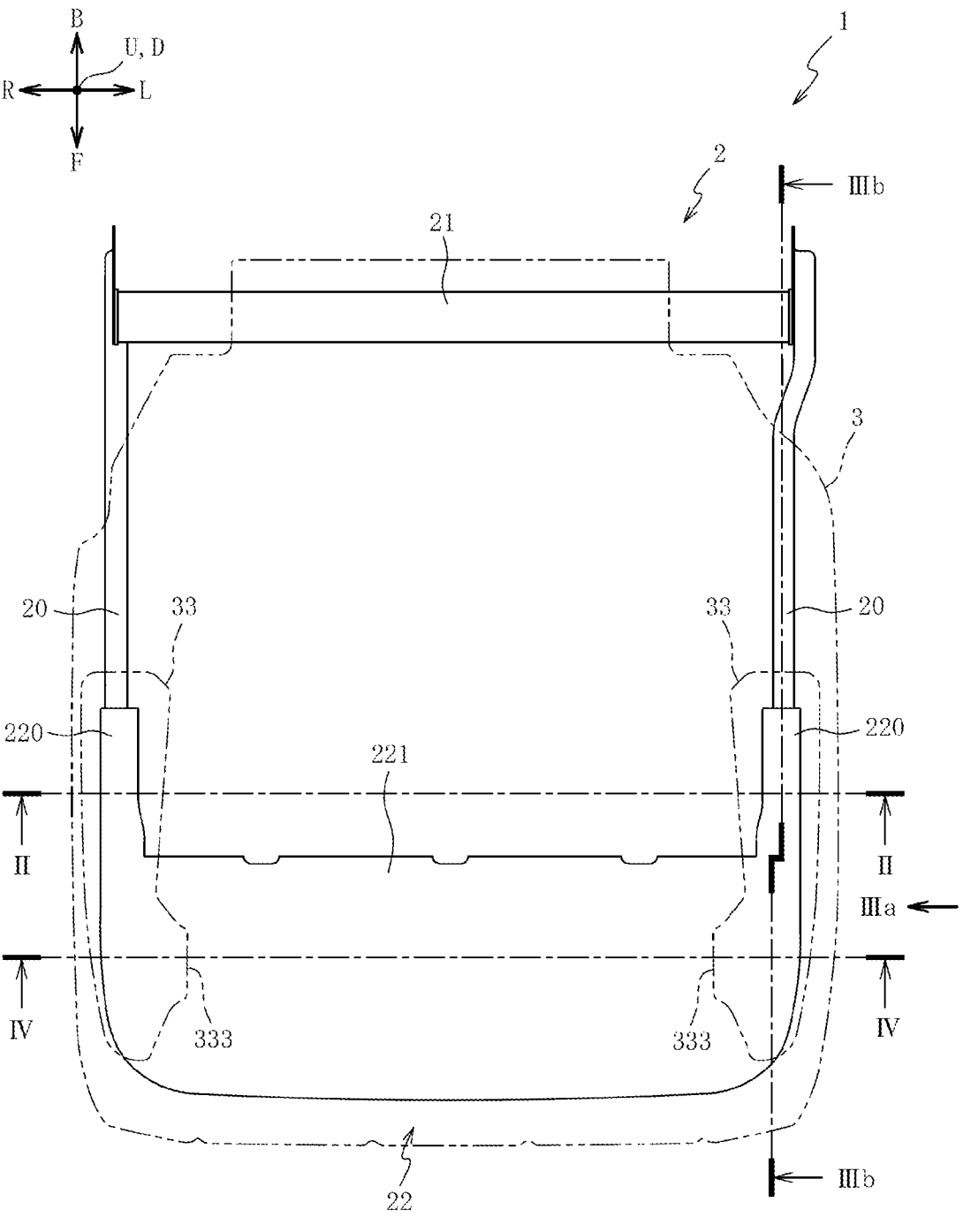
FIG. 1 is a top view of a vehicle seat.

A preferred embodiment of the present invention is described below with reference to the attached drawings. First, with reference to FIGS. 1 and 2, an entire structure of a vehicle seat 1 is described. FIG. 1 is a top view of the vehicle seat 1, and FIG. 2 is a partial enlarged sectional view of a cushion frame 2 and a cushion pad 3 along line II-II in FIG. 1.

Figure 2:
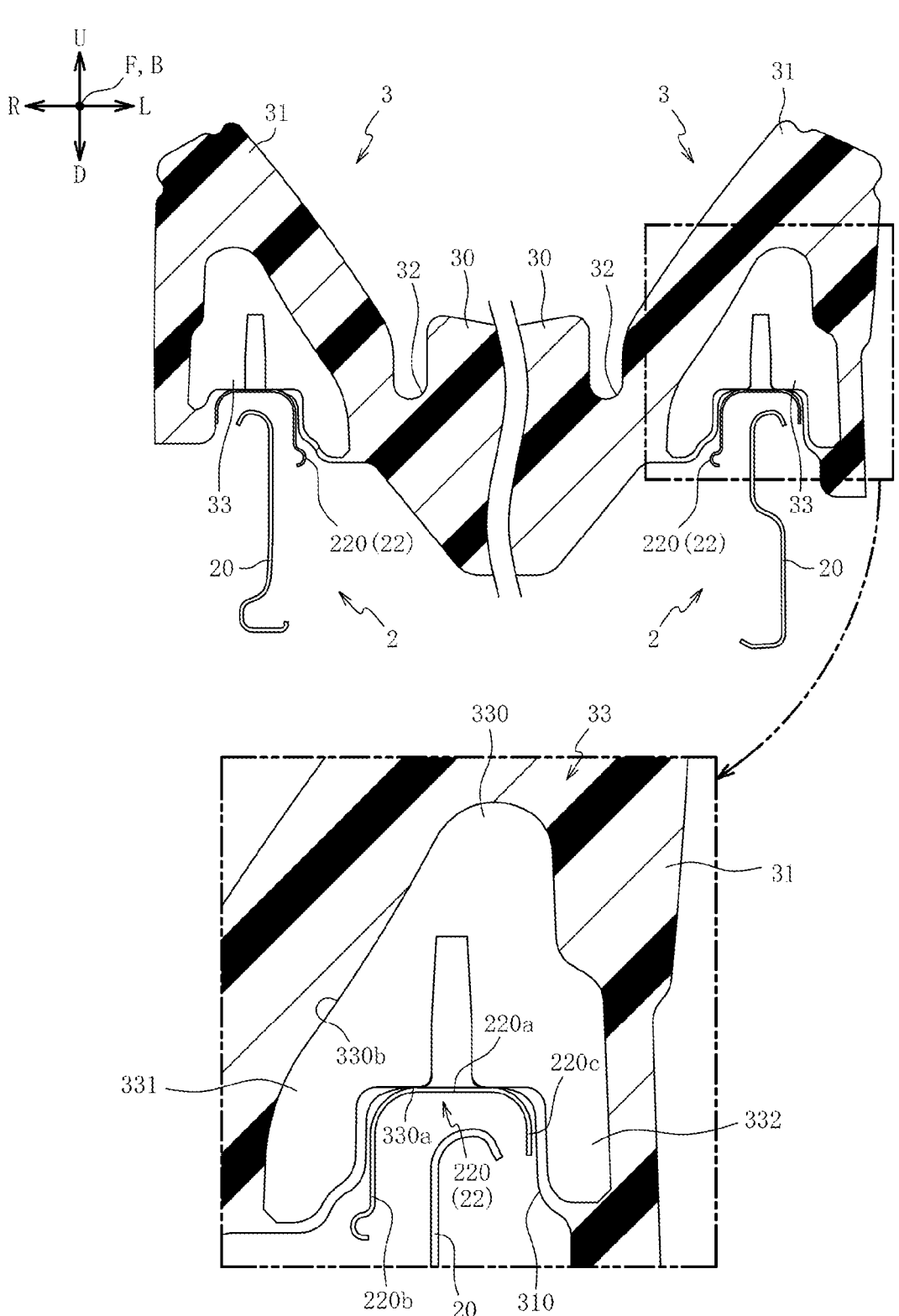
FIG. 2 is a partial enlarged sectional view of a cushion frame and a cushion pad along line II-II in FIG. 1.

Note that FIG. 1 shows by alternate long and two short dash lines the cushion pad 3 that is supported by the cushion frame 2 and insert members 33 that are embedded inside the cushion pad 3, and FIG. 2 does not show hatching of the insert members 33 in order to simplify the figure. Directions of double-headed arrow U-D, double-headed arrow L-R, and double-headed arrow F-B in FIGS. 1 and 2 denote up-down directions, left-right directions, and front-back directions of the vehicle seat 1 respectively (this also applies to FIGS. 3A and 3B and subsequent drawings).

As shown in FIGS. 1 and 2, the vehicle seat 1 is a seat that is installed in a vehicle, such as a car. The vehicle seat 1 includes the cushion frame 2 that is a framework of a sitting surface (seat cushion) of the vehicle seat 1. A seat back (back frame) (not shown) is tiltably connected to a back end (end portion on a side in the direction of arrow B) of the cushion frame 2.

The cushion frame 2 includes side frames 20 that extend in the front-back directions (the directions of double-headed arrow F-B), and back ends of the two side frames 20 that are separated from each other on the left and right (the directions of double-headed arrow L-R) are connected to each other by a rear frame 21 (shown in FIG. 1) that extend toward the left and right.

Front frame 22 are provided on the left and right to extend between front end portions of the two side frames 20 on the left and right. Each front frame 22 includes a corresponding one of two covering portions 220 on the left and right and a connecting portion 221 (see FIG. 1) that connects the two covering portions 220 on the left and right, the two covering portions 220 covering an upper surface of the corresponding one of the side frames 20. The portions 220 and 221 are integrally formed by using a metallic plate.

A rectangular frame is formed in top view by the frames 20 to 22 that constitute the cushion frame 2, and end portions of the cushion pad 3 are supported by the rectangular frame. Although not shown, a spring is provided between the rear frame 21 and the connecting portion 221 of each front frame 22, and a central part of the cushion pad 3 is supported by the spring.

The side frames 20 of the cushion frame 2 are members that are formed by, for example, bending a metallic plate, and front end side parts of the side frames 20 are each covered from thereabove by the covering portion 220 of a corresponding one of the front frames 22. As shown by an enlarged portion in FIG. 2, the covering portion 220 of each front frame 22 includes an upper plate 220a that covers the upper surface of the side frame 20 and two side plates 220b and 220c on the left and right that protrude downward from a corresponding one of two end portions on the left and right of the upper plate 220a, and is formed in a substantially U shape.

Each side plate 220b is formed so as to cover a side surface on an inner surface in the left-right directions of the side frame 20 corresponding thereto, and each side plate 220c is formed so as to cover a side surface on an outer side in the left-right directions of the side frame 20 corresponding thereto. At front end sides (sides in the direction of arrow F in FIG. 1) of the covering portions 220, the side plates 220b of the covering portions 220 on the left and right are connected to each other by the connecting portion 221.

In this way, portions of the front end sides of the side frames 20 are covered by the covering portions 220 of the respective front frames 22, and left and right edge portions of the cushion pad 3 each include a region that is supported by the side frame 20 through the covering portion 220 and a region that is directly supported by the side frame 20. That is, each covering portion 220 (a portion of the front frame 22) is constituted as a support frame that, together with the corresponding side frame 20, extends toward the front and back and supports the cushion pad 3.

The cushion pad 3 includes a main portion 30 (see FIG. 2) that is positioned in the center in the left-right directions and supports an occupant from below the occupant, and side portions 31 that each protrude upward from a corresponding one of two end portions on the left and right of the main portion 30 and support an occupant from a side of the occupant. These portions 30 and 31 are integrally formed from foam (soft foam), such as soft urethane foam.

Suspension grooves 32 are formed at, for example, a boundary portion between the main portion 30 and one of the side portions 31 and a boundary portion between the main portion 30 and the other side portion 31, and a skin (not shown) is attached to the suspension grooves 32. A surface of the cushion pad 3 is covered by the skin.

Grooves 310 (see the enlarged portion in FIG. 2) having shapes corresponding to the respective covering portions 220 are formed in lower surfaces of the respective side portions 31 of the cushion pad 3, and the covering portions 220 (the side frames 20) are fitted into the respective grooves 310 that extend towards the front and back.

When a relatively large load in the left-right directions acts upon the side portions 31 from an occupant, the side portions 31 are deformed toward outer sides in the left-right directions so as to rotate around the respective covering portions 220 (the side frames 20). The cushion pad 3 includes the insert members 33 for suppressing the deformation of the side portions 31.

The insert members 33 that extend in the front-back directions are embedded in the inside of the respective side portions 31, and the hardnesses of the side portions 31 are higher than the hardness of the main portion 30 and the hardnesses of the insert members 33 are higher than the hardnesses of the side portions 31. Therefore, since the cores of the side portions 31 can be hard, it is possible to suppress deformation of the side portions 31 toward the outer sides in the left-right directions. Thus, it is possible to improve the ability to support an occupant by the side portions 31.

Next, with reference to FIGS. 2 and 3A and 3B, a detailed structure of an insert member 33 is described. FIG. 3A is a side view of an insert member 33 when viewed in a direction of arrow IIIa in FIG. 1, and FIG. 3B is a sectional view of the insert member 33 along line IIIb-IIIb in FIG. 1. Note that FIG. 3A shows by a broken line an edge line of a first leg portion 331 that is hidden by a second leg portion 332, and a lower surface 330a of the main body 330 that is positioned between the first leg portion 331 and a third leg portion 333.

Figure 3:
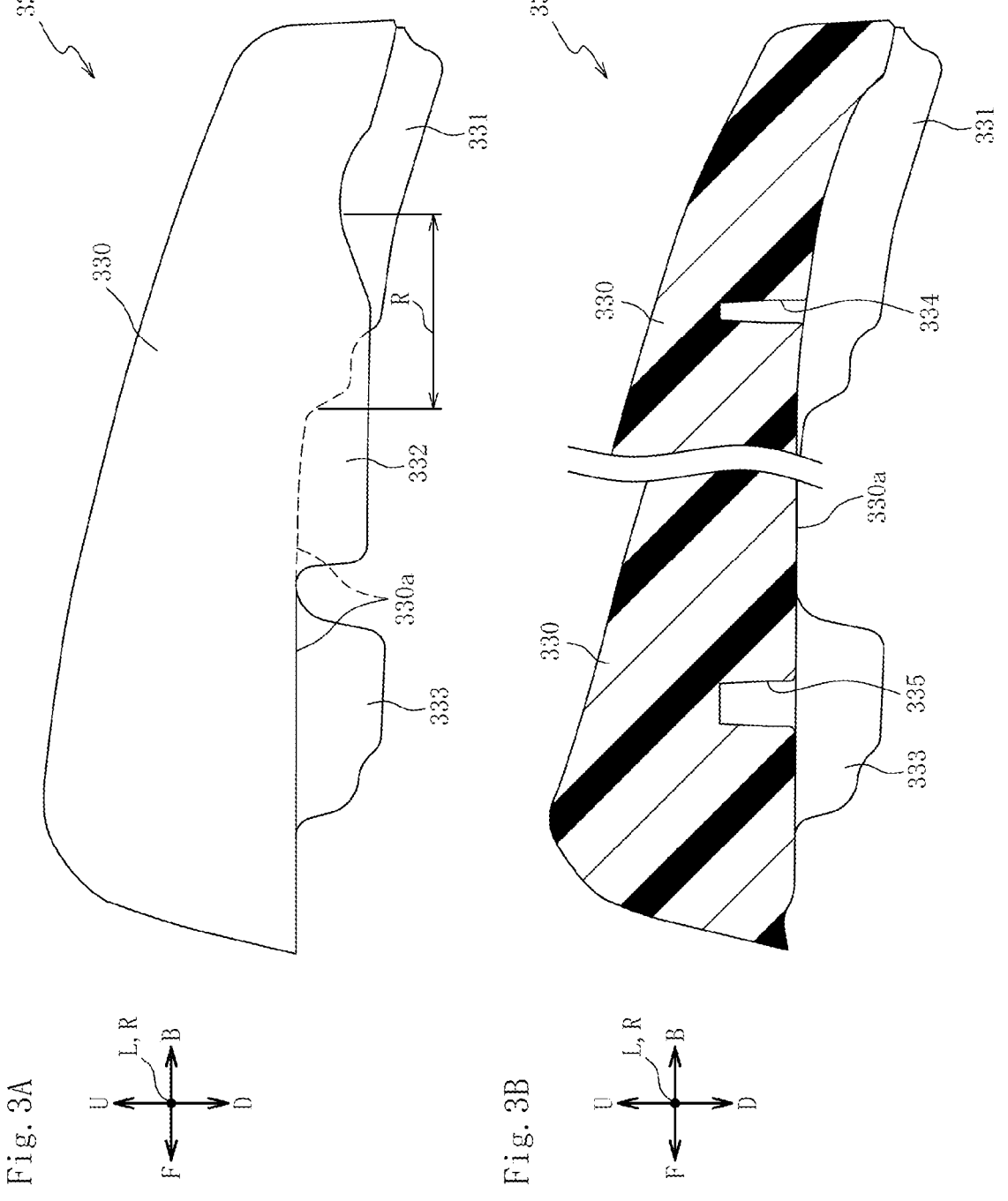
FIG. 3A is a side view of an insert member when viewed in the direction of arrow IIIa in FIG. 1.
FIG. 3B is a sectional view of the insert member along line IIIb-IIIb in FIG. 1.

As shown in FIGS. 2 and 3A and 3B, the insert member 33 includes the main body 330 that is supported by the side frame 20 through the covering portion 220 of the front frame 22, and the first to third leg portions 331 to 333 that are formed on two end portions on the left and right (the directions of double-headed arrow L-R) of the main body 330 (as regards the third leg portion 333, see FIG. 3). The portions 330 to 333 are integrally formed of a resin material (in the present embodiment, a foaming material including expanded polypropylene).

The main body 330 has a mountain shape in cross section in accordance with the shape of the side portion 31, and the dimension of the main body 330 in the front-back directions (the directions of double-headed arrow F-B) is larger than its dimension in the up-down directions and its dimension in the left-right directions.

A side surface of the main body 330 that faces an inner side in the left-right directions has an inclined surface 330b (see the enlarged portion in FIG. 2) that is inclined downward toward an inner side of the covering portion 220 in the left-right directions from an upper end side to a lower end side thereof. In a cross-sectional view that has been cut by a plane orthogonal to the front-back directions, the inclined surface 330b has a curved shape that is recessed toward the outer side in the left-right directions thereof. Since the thighs of an occupant are easily supported by the inclined surface 330b having such a curved shape, it is possible to improve the ability to support the occupant by the side portion 31.

The first to third leg portions 331 to 333 are protrusions that protrude downward with respect to the lower surface 330a of the main body 330 of the insert member 33, and lower ends of the first to third leg portions 331 to 333 are positioned below an upper end of the side frame 20. The first and second leg portions 331 and 332 extend substantially vertically downward from the lower surface 330a of the main body 330, and the first leg portion 331 extends toward the inner side of the covering portion 220 (the side frame 20) in the left-right directions. The second leg portion 332 extends toward an outer side of the covering portion 220 (the side frame 20) in the left-right directions.

Since the side plates 220b and 220c of the covering portion 220 (the side frame 20) are placed between the first leg portion 331 and the second leg portion 332 from a left side and a right side, even if a relatively large load is applied to the side portion 31 from an occupant, deformation of the side portion 31 toward the outer side in the left-right directions (rotation of the insert member 33 around covering portion 220) can be restricted by engagement of the covering portion 220 with the first and second leg portions 331 and 332. Therefore, it is possible to improve the ability to support an occupant by the side portion 31.

Since the first leg portion 331 and the second leg portion 332, when viewed in the left-right directions, are formed where they partly overlap each other, it is possible to effectively restrict deformation of the side portion 31 toward the outer side in the left-right directions by engagement of the covering portion 220 with the first and second leg portions 331 and 332.

The first leg portion 331 and the second leg portion 332 are formed in a region including a substantial center of the side portion 31 in the front-back directions. Therefore, since it is possible to dispose the first and second leg portions in a region where a load applied from an occupant (near the thighs) is relatively large, it is possible to effectively restrict deformation of the side portion 31 toward the outer side in the left-right directions by engagement of the covering portion 220 with the first and second leg portions 331 and 332.

Note that the "substantial center" of the side portion 31 in the front-back directions refers to a range that is (±) 50 mm in front of and behind as a center the center of the side portion 31 (part that protrudes upward from the main portion 30) in the front-back directions. By providing in this region a region R (see FIG. 3A) where the first leg portion 331 and the second leg portion 332 face each other, it is possible to effectively restrict deformation of the side portion 31 toward the outer side in the left-right directions by engagement of the covering portion 220 with the first and second leg portions 331 and 332.

Here, a vehicle doorway (not shown) is provided adjacent to the left side (side in the direction of arrow L in FIG. 2) of the cushion pad 3 as viewed from an occupant, and a vehicle component (not shown), such as a console box, is provided on the right side (side in the direction of arrow R in FIG. 2) of the cushion pad 3. When, for example, an occupant gets into a vehicle from the vehicle doorway, the side portion 31 is deformed toward the inner side in the left-right directions by a load that is received from the occupant. When such a deformation occurs in the side portion 31, the second leg portion 332 of the insert member 33 is pushed against the covering portion 220, and a relatively large load may act upon the second leg portion 332.

In contrast, in the present embodiment, the second leg portion 332 extends forward (side in the direction of arrow F) with respect to the region R where the second leg portion 332 faces the first leg portion 331, and is relatively long in the front-back directions. Therefore, for example, in the case where an occupant gets into a vehicle from the doorway above, even when a load acting toward the inner side in the left-right directions acts upon the side portion 31 (the insert member 33), the side portion 31 can receive the load by dispersing the load by the second leg portion 332 formed to be relatively long in the front-back directions. Therefore, it is possible to suppress damage to the second leg portion 332.

On the other hand, since a load that acts when, for example, an occupant gets into a vehicle from the doorway does not act upon the side portion 31 on a central side of the vehicle in the width direction (side in the direction of arrow R in FIG. 2), in the present embodiment, only the insert member 33 at the side portion 31 on a doorway side (side in the direction of arrow L in FIG. 2) (see the enlarged portion in FIG. 2) is provided with the second leg portion 332. That is, since the insert member 33 of the side portion 31 on the central side of the vehicle in the width direction (side in the direction of arrow R in FIG. 2) is not provided with a second leg portion 332, it is possible to suppress restrictions on the disposition and shape of a vehicle component (for example, a console box) that is provided on the central side of the vehicle in the width direction. Therefore, it is possible to more freely design the vehicle seat 1.

Figure 4:
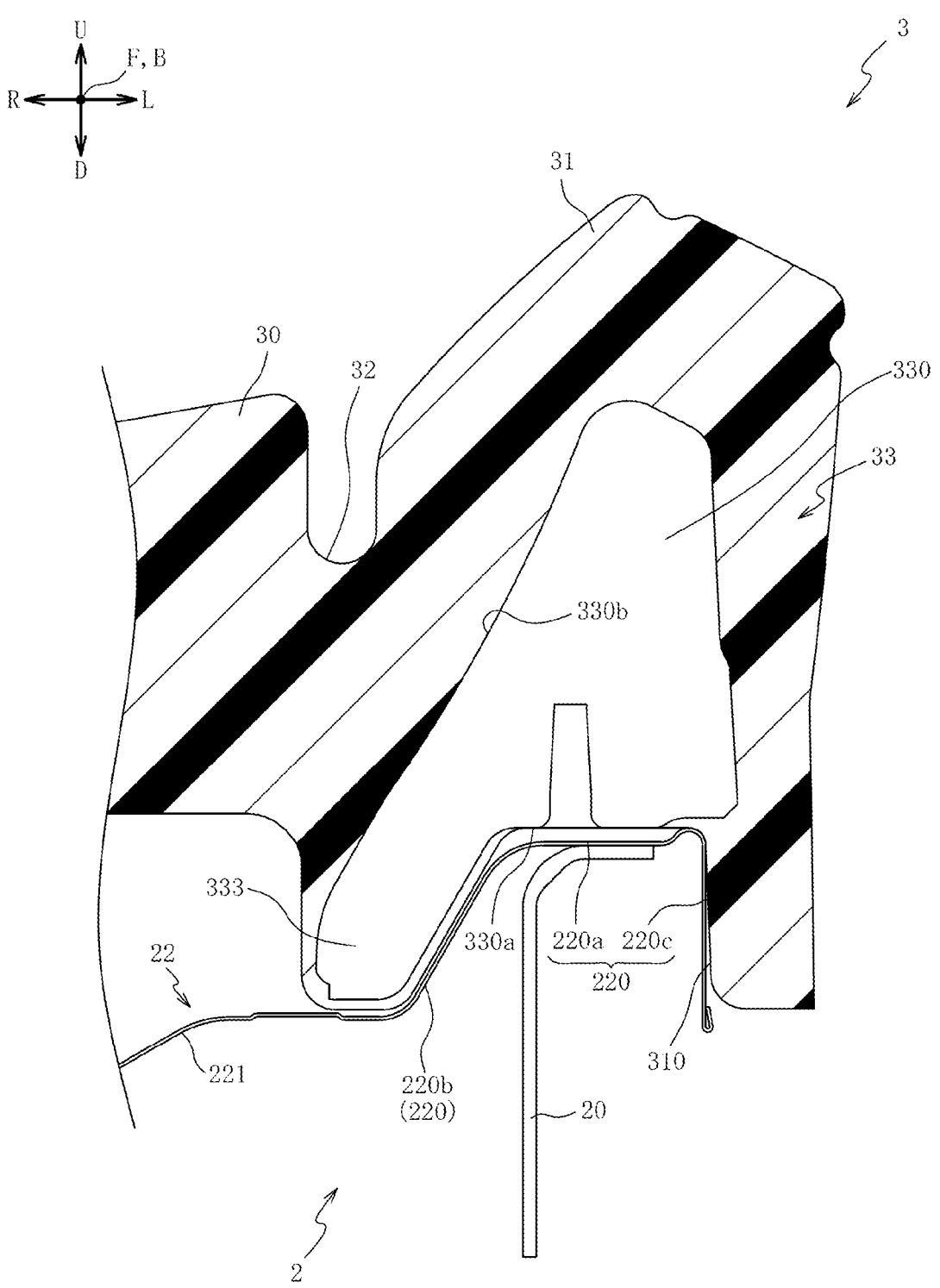
FIG. 4 is a partial enlarged sectional view of the cushion frame and the cushion pad along line IV-IV in FIG. 1.

Next, the structure of the insert member 33 is further described with reference to FIGS. 3A and 3B and FIG. 4. FIG. 4 is a partial enlarged sectional view of the cushion frame 2 and the cushion pad 3 along line IV-IV in FIG. 1. Note that FIG. 4 does not show hatching of the insert member 33 in order to simplify the figure.

With reference to FIGS. 3A and 3B and FIG. 4, in a region where the third leg portion 333 of the insert member 33 is formed, the side plate 220b of the covering portion 220 is inclined downward toward the inner side in the left-right directions (directions of the double-headed arrow L-R), and the connecting portion 221 that extends toward the left and right is connected to a lower end of the inclining side plate 220b. The third leg portion 333 is inclined downward toward the inner side in the left-right directions along the inclination of the side plate 220b of the covering portion 220, and the third leg portion 333 is supported from therebelow by the covering portion 220 (the side plate 220b) and the connecting portion 221.

Since the third leg portion 333 is formed in a region where a load acts from near the knee of the thigh of an occupant, a load that is applied from the occupant to the third leg portion 333 is relatively small compared with the load that is applied to the first leg portion 331 and the second leg portion 332 from the occupant. In contrast, since the third leg portion 333 extends to be longer on the inner side in the left-right directions than the first leg portion 331 (see FIG. 1), the third leg portion 333 is easily pushed against the covering portion 220 by the load from the occupant. Therefore, since the covering portion 220 easily engages with the first and second leg portions 331 and 332, it is possible to effectively restrict deformation of the side portion 31 toward the outer side in the left-right directions.

The inclined surface 330b of the main body 330 along the thigh of the occupant above extends in the front-back directions (directions of double-headed arrow F-B) from a region where the third leg portion 333 is formed to a region where the first leg portion 331 is formed. Therefore, since the covering portion 220 easily engages with the first and second leg portions 331 and 332 by a load from the occupant, it is possible to effectively restrict deformation of the side portion 31 toward the outer side in the left-right directions.

In the case where such first to third leg portions 331 to 333 are to engage with the covering portion 220, for example, by extending the second leg portion 332 toward a forward side (side in the direction of arrow F in FIG. 3) or by extending the third leg portion 333 toward a back side (side in the direction of arrow B in FIG. 3), it is possible to cause the second leg portion 332 and the third leg portion 333 to face each other in the left-right directions. However, when the first to third leg portions 331 to 333 are formed longer than required, the arrangement of other components (for example, components that constitute the vehicle seat 1) around the insert member 33 tends to be restricted.

In contrast, in the present embodiment, the third leg portion 333 is formed on a back side with respect to the second leg portion 332, and the dimension of the third leg portion 333 in the front-back directions is smaller than the dimension of the second leg portion 332 (the first leg portion 331) in the front-back directions. That is, the second leg portion 332 and the third leg portion 333 are formed in a minimum region required. Therefore, since it is possible to suppress restrictions on the arrangement of other components around the insert member 33, it is possible to more freely design the vehicle seat 1.

Since the first to third leg portions 331 to 333 are formed at positions that are displaced from each other at the front and back, even if a load that rotates the insert member 33 around a vertical axis acts from an occupant, it is possible to restrict such a rotation of the insert member 33 by engagement of the covering portion 220 with the first to third leg portions 331 to 333. Therefore, it is possible to improve the ability to support an occupant by the side portion 31.

First and second insertion holes 334 and 335 (see FIG. 3) are formed in a corresponding one of two locations, which are apart from each other in the front and back, in the lower surface 330a of the main body 330 of the insert member 33. The first and second insertion holes 334 and 335 are holes for fixing the insert member 33 to a lower die 100 (see FIG. 5) when the cushion pad 3 is molded by using a die. A method of molding the cushion pad 3 by using the lower die 100 is described with reference to FIGS. 4 and 5.

FIG. 5A is a partial enlarged sectional view of the lower die 100, showing a state in which the insert member 33 is fixed, and FIG. 5B is a partial enlarged sectional view of the lower die 100 along line Vb-Vb in FIG. 5A.

As shown in FIGS. 4 and 5, when molding the cushion pad 3, with the insert member 33 fixed to the lower die 100, an upper die (not shown) performs clamping, and an undiluted solution of soft foam injected into a cavity between the upper die and the lower die 100 is caused to foam and harden. Therefore, the cushion pad 3 in which the insert member 33 is embedded inside the side portion 31 is formed.

Note that, since, for the method of molding the cushion pad 3, related-art methods can be used, detailed descriptions thereof are not given. However, examples of related-art methods include a method of integrally molding a cushion pad and an insert member in Japanese Unexamined Patent Application Publication No. 2009-297285 and a method of molding a cushion pad having a difference in hardness in Japanese Unexamined Patent Application Publication No. 2015-231494.

At the time of performing such molding by using a die, since a foaming material flows around the insert member 33, when the first to third leg portions 331 to 333 of the insert member 33 are formed to be long in the front-back directions (directions of double-headed arrow F-B), the spread of the foaming material becomes poor correspondingly. In contrast, in the present embodiment, as described above, since the second leg portion 332 and the third leg portion 333 are formed in a minimum region required, the flow of the foaming material is unlikely to be impeded.

Here, in order to effectively exhibit the ability to support an occupant by the side portion 31, the arrangement of the first to third leg portions 331 to 333 (in particular, the first leg portion 331 and the second leg portion 332 on respective sides of the covering portion 220) of the insert member 33 at the side portion 31 becomes important. Therefore, when molding the cushion pad 3, it becomes necessary to dispose the insert member 33 at a desired (in-accordance-with-the-design) position with respect to the lower die 100. Two protrusions 101 and 102 are provided for positioning the insert member 33.

The protrusions 101 and 102 are each formed with a circular columnar shape that protrudes upward from the lower die 100, and the first and second insertion holes 334 and 335 are formed in positions of the insert member 33 that correspond to the positions of the protrusions 101 and 102 of the lower die 100. Since, by inserting the protrusions 101 and 102 into a corresponding one of the first and second insertion holes 334 and 335 of the insert member 33, it is possible to restrict rotation of the insert member 33 with respect to the lower die 100, the insert member 33 is easily disposed at a desired position with respect to the side portion 31. Therefore, for example, it is possible to reliably dispose the first leg portion 331 and the second leg portion 332 in regions where a load of an occupant is likely to act. Thus, it is possible to effectively restrict deformation of the side portion 31 toward the outer side in the left-right directions by engagement of the covering portion 220 with the first and second leg portions 331 and 332.

In this way, although, by disposing the insert member 33 (the first to third leg portions 331 to 333) at a desired position, it is possible to effectively engage the covering portion 220 with the first to third leg portions 331 to 333, when a dimensional error occurs in the insert member 33 itself, the arrangement of the first to third leg portions 331 to 333 may not be in accordance with the design. In particular, since the insert member 33 of the present embodiment is formed to be long in the front-back directions (the dimension in the front-back directions is larger than the dimension in the up-down directions and the dimension in the left-right directions), a dimensional error in the front-back directions relatively easily occurs in the insert member 33.

Therefore, in the present embodiment, the first insertion hole 334 is formed in the region R (see FIG. 3A) where the first leg portion 331 and the second leg portion 332 face each other. That is, since the first and second leg portions 331 and 332 and the first insertion hole 334 are formed at positions that are side by side with each other on the left and right (directions of the double-headed arrow L-R), even if an error has occurred in the dimension of the insert member 33 in the front-back directions, errors in the relative positions of the first and second leg portions 331 and 332 and the first insertion hole 334 in the front-back directions are unlikely to occur.

Therefore, even when the protrusion 101 of the lower die 100 is inserted into the first insertion hole 334, the first and second leg portions 331 and 332 are easily disposed at desired positions in the front-back directions. Therefore, it is possible to effectively restrict deformation of the side portion 31 toward the outer side in the left-right directions by engagement of the covering portion 220 with the first and second leg portions 331 and 332.

Since the first insertion hole 334 is a cross-sectional circular hole having an inside diameter that is the same as the diameter of the protrusion 101, when the protrusion 101 is inserted into the first insertion hole 334, it is possible to restrict relative displacement of the insert member 33 with respect to the lower die 100 in the front-back directions and the left-right directions. Therefore, since the first and second leg portions 331 and 332 are easily disposed at desired positions in the front-back directions and the left-right directions, it is possible to effectively restrict deformation of the side portion 31 toward the outer side in the left-right directions by engagement of the covering portion 220 with the first and second leg portions 331 and 332.

On the other hand, the second insertion hole 335 that is positioned on the forward side (side in the direction of arrow F) with respect to the first insertion hole 334 is a long hole whose dimension in the front-back directions is larger than the diameter of the protrusion 102. Therefore, when the protrusion 102 is inserted into the second insertion hole 335, play (gap) is formed between the second insertion hole 335 and the protrusion 102 in the front-back directions. Thus, even if an error has occurred in the dimension of the insert member 33 (interval between the first and second insertion holes 334 and 335) in the front-back directions, it is possible to insert the protrusion 102 into the second insertion hole 335. That is, when an error has occurred in the dimension of the insert member 33 in the front-back directions, since it is possible to suppress forcible insertion of the protrusion 102 into the second insertion hole 335, it is possible to suppress damage to the insert member 33.

The dimension of the second insertion hole 335 in the left-right directions (the directions of the double-headed arrow L-R) is the same as the diameter of the protrusion 102 (see FIG. 5B). Therefore, when the protrusion 102 is inserted into the second insertion hole 335, since it is possible to restrict positional displacement of the insert member 33 with respect to the lower die 100 in the left-right directions (that is, rotation of the insert member 33 around the protrusion 101), the first to third leg portions 331 to 333 are easily disposed at desired positions in the left-right directions. Thus, it is possible to effectively restrict deformation of the side portion 31 toward the outer side in the left-right directions by engagement of the covering portion 220 with the first to third leg portions 331 to 333.

Since the second insertion hole 335 is formed such that the second insertion hole 335 and the third leg portion 333 are formed at positions that are side by side with each other on the left and right, the third leg portion 333 is easily disposed at a desired position in the left-right directions. Therefore, since the third leg portion 333 is easily pushed against the covering portion 220 by the load from an occupant, it is possible to effectively restrict deformation of the side portion 31 toward the outer side in the left-right directions by engagement of the covering portion 220 with the first to third leg portions 331 to 333.

Although the present invention has been described based on the embodiment above, the present invention is not limited in any way to the forms above, and it can be easily inferred that various modifications and improvements are possible within a scope that does not depart from the spirit of the present invention.

Although, in the embodiment above, the case in which the hardness of each side portion 31 is higher than the hardness of the main portion 30 of the cushion pad 3 has been described, the present invention is not limited thereto. For example, the hardness of each side portion 31 may be the same as (or lower than) the hardness of the main portion 30.

Although, in the embodiment above, as an example of the material of each insert member 33, a foaming material including expanded polypropylene has been exemplified, the material of each insert member 33 can be set as appropriate as long as the material of each insert member 33 has a hardness that is higher than the hardness of each side portion 31.

Therefore, for example, as the material of each insert member 33, chip urethane formed by crushing/adhering scraps or the like produced by a process of manufacturing soft polyurethane foam may be used, or soft urethane foam similar to that of each side portion 31 may be used. When each insert member 33 is made of soft urethane foam similar to that of each side portion 31, the hardness of each insert member 33 measured in conformity with a D method of JIS K6400-2 (2012 edition) is to be made higher than the hardness of each side portion 31.

Although, in the embodiment above, the case in which each insert member 33 is supported by the corresponding side frame 20 through the covering portion 220 of the corresponding front frame 22 has been described, the present invention is not limited thereto. For example, each insert member 33 in its entirety may be supported by only the corresponding side frame 20 (each covering portion 220 does not exist in the region where each insert member 33 is embedded).

In the embodiment above, although not described, the lower surface 330*a* of the main body 330 of each insert member 33 or the outer surfaces (for example, surfaces facing the covering portions 220) of the first to third leg portions 331 to 333 may be exposed at the lower surfaces (the grooves 310) of the side portions 31, or may be covered by the side portions 31.

Although, in the embodiment above, the case in which the first leg portion 331 and the second leg portion 332 are formed where they partly overlap each other when viewed in the left-right directions and in which the first leg portion 331 and the second leg portion 332 are disposed at the substantial center of the side portion 31 in the front-back directions has been described, the present invention is not limited thereto. For example, the first leg portion 331 and the second leg portion 332 may be formed so as not to overlap each other when viewed in the left-right directions, or one or both of the first leg portion 331 and the second leg portion 332 may be disposed on the forward side or the rearward side with respect to the substantial center of the side portion 31 in the front-back directions.

Although the case in which the second leg portion 332 extends toward the forward side with respect to the first leg portion 331 and in which the third leg portion 333 is formed on the forward side with respect to the second leg portion 332 has been described, the present invention is not limited thereto. For example, the first leg portion 331 may extend toward the forward side respect to the second leg portion 332 or the second leg portion 332 may be formed on the forward side with respect to the first leg portion 331. Alternatively, the second leg portion 332 may be extended toward the forward side to face the third leg portion 333 on the left or right, or the first leg portion 331 may be extended toward the forward side to be connected to the third leg portion 333 (a leg portion that is continuously formed from the first leg portion 331 to the third leg portion 333 may be formed).

Further, although the case in which the third leg portions 333 protrude toward the inner sides in the left-right directions with respect to the first leg portions 331 has been described, the first leg portions 331 may protrude toward the inner sides in the left-right directions with respect to the third leg portions 333, or the third leg portions 333 may be omitted. That is, as long as the left and right sides of each covering portion 220 (each side frame 20) are placed between portions of the corresponding insert member 33, it is possible to set as appropriate the arrangement and the form of the leg portions of each insert member 33.

Although, in the embodiment above, the case in which, when each insert member 33 is fixed to the lower die 100 (die), the protrusions 101 and 102 are inserted into the respective first and second insertion holes 334 and 335 has been described, the present invention is not limited thereto. For example, one or three or more insertion holes of each insert member 33 (protrusions of the lower die 100) may be formed. Instead of fitting the insertion holes and the protrusions to each other, each insert member 33 may be fixed to the lower die 100 by other publicly known means, such as magnets.

Although, in the embodiment above, the case in which the first and second insertion holes 334 and 335 are formed in the lower surface 330*a* of each main body 330 has been described, the first and second insertion holes 334 and 335 may be formed in a side surface or an upper surface of each insert member 33.

Although, in the embodiment above, the case in which the first and second insertion holes 334 and 335 are formed at positions that are apart from each other on the front and back, in which the first insertion hole 334 is formed at a position between the first leg portion 331 and the second leg portion 332, and in which the second insertion hole 335 is formed at a position that is side by side with the third leg portion 333 on the left and right has been described, the present invention is not limited thereto. For example, the first and second insertion holes 334 and 335 may be formed side by side with each other on the left and right, or either one or both of the first and second insertion holes 334 and 335 may be formed at positions that are not side by side with the first to third leg portions 331 to 333 on the left and right.

Although, in the embodiment above, the case in which, whereas the protrusions 101 and 102 of the lower die 100 are formed with a circular columnar shape (cross-sectional circular shape), the first and second insertion holes 334 and 335 are circular holes or long holes has been described, the present invention is not limited thereto. For example, the cross-sectional shape of each of the protrusions 101 and 102 may be a polygonal shape or an elliptical shape. No matter what cross-sectional shape the protrusions 101 and 102 have, as a result of forming the first and second insertion holes 334 and 335 with cross-sectional shapes corresponding to (that are the same as) the cross-sectional shapes of the protrusions 101 and 102 or as a result of forming the first and second insertion holes 334 and 335 with shapes that inscribe the protrusions 101 and 102 at a plurality of locations, it is possible to restrict displacement (rotation) of each insert member 33 in the front-back directions and the left-right directions.

Although, in the embodiment above, the case in which displacement of each insert member 33 toward the front and back and toward the left and right is restricted by fitting the first insertion hole 334 and the protrusion 101 to each other has been described, the present invention is not limited thereto. For example, in either the front-back directions or the left-right directions or in the front-back directions and the left-right directions, there may be play between the first insertion hole 334 and the protrusion 101.

Although, in the embodiment above, the case in which displacement of each insert member 33 in the left-right directions is restricted by fitting the second insertion hole 335 and the protrusion 102 to each other (there is play in the front-back directions between the second insertion hole 335 and the protrusion 102) has been described, the present invention is not limited thereto. For example, displacement of each insert member 33 in the front-back directions and the left-right directions may be restricted by fitting the second insertion hole 335 and the protrusion 102 to each other (there is no play between the second insertion hole 335 and the protrusion 102), or there may be play between the second insertion hole 335 and the protrusion 102 in the front-back directions and the left-right directions.

Although, in the embodiment above, the case in which the insert member 33 provided at the side portion 31 on the central side of a vehicle in the width direction (side in the direction of arrow R in FIG. 2) is not provided with the second leg portion 332 has been described, the present invention is not limited thereto. For example, the insert member 33 provided at the side portion 31 on the central side of the vehicle in the width direction may be provided with the second leg portion 332, or the insert member 33 provided at the side portion 31 on a doorway side may not be provided the second leg portion 332. Alternatively, of the two side portions 31 that are the left and right side portions 31, either one of the side portions 31 may not be provided with the insert member 33.

Although, in the embodiment above, the case in which side surfaces of the insert members 33 (the main bodies 330) that face toward the inner sides in the left-right directions have inclined surfaces 330*b* and in which the inclined surfaces 330*b* have curved shapes that are recessed toward the outer sides in the left-right directions has been described, the present invention is not limited thereto. For example, the inclined surfaces 330*b* may be flat surfaces or may have curved shapes that protrude toward the inner sides in the left-right directions. Alternatively, the side surfaces of the insert members 33 (the main bodies 330) that face the inner sides in the left-right directions may be flat surfaces that extend upward and downward. That is, the shapes of the main bodies 330 of the insert members 33 are not limited to the shapes above.

DESCRIPTION OF REFERENCE NUMERALS

1 vehicle seat
2 cushion frame
20 side frame (support frames)
220 covering portion (support frames)
3 cushion pad
30 main portion
31 side portion
33 insert member
330*b* inclined surface
331 first leg portion
332 second leg portion
333 third leg portion
334 first insertion hole
335 second insertion hole
100 lower die (die)
101,102 protrusion

What is claimed is:

1. A vehicle seat comprising:
a cushion frame that includes two support frames that are left and right support frames and that extend in front-back directions; and
a cushion pad that is supported by the cushion frame,
wherein the cushion pad includes
a main portion that constitutes a part of the cushion pad on a central side in left-right directions and that supports an occupant from below the occupant,
side portions that are each supported by a corresponding one of the support frames on either a left side or a right side of the main portion and that each protrude upward from the main portion and support the occupant from a side of the occupant, and
insert members that are each provided inside a corresponding one of the side portions and whose hardnesses are higher than hardnesses of the side portions,
wherein at least one of the insert members includes a first leg portion and a second leg portion, the first leg portions extending toward inner sides of the support frames in the left-right directions, the second leg portions extending toward outer sides of the support frames in the left-right directions, and
wherein each of the support frames is placed between a corresponding one of the first leg portions and a corresponding one of the second leg portions from a left side and a right side,
wherein the first leg portions and the second leg portions, when viewed in the left-right directions, are formed at positions in a staggered manner along the front-back directions such that front portions of the first leg portions overlap rear portions of the second leg portions and rear portions of the first leg portions do not overlap the second leg portions.

2. The vehicle seat according to claim 1,
wherein the first leg portions and the second leg portions, when viewed in the left-right directions, are formed at positions where the first leg portions each overlap a corresponding one of the second leg portions.

3. The vehicle seat according to claim 2,
wherein the first leg portions and the second leg portions are each disposed at substantially a center of a corresponding one of the side portions in the front-back directions.

4. The vehicle seat according to claim 3,
wherein each of the second leg portions extends on a forward side with respect to a corresponding one of the first leg portions.

5. The vehicle seat according to claim 4,
wherein each of the insert members includes a third leg portion that is formed on a forward side with respect to a corresponding one of the second leg portions, the third leg portions extending toward the inner sides of the support frames in the left-right directions, and
wherein the third leg portions protrude toward inner sides in the left-right directions with respect to the first leg portions.

6. The vehicle seat according to claim 1,
wherein each of the insert members has a first insertion hole and a second insertion hole, each configured to be used for receiving a protrusion of a die when the cushion pad is molded by the die.

7. The vehicle seat according to claim 6,
wherein the first leg portions and the second leg portions, when viewed in the left-right directions, are formed at positions where the first leg portions each overlap a corresponding one of the second leg portions, and wherein each of the first insertion holes is formed between a corresponding one of the first leg portions and the corresponding one of the second leg portions.

8. The vehicle seat according to claim 7, wherein the first insertion holes and the second insertion holes are formed apart from each other in the front-back directions, wherein the first insertion holes are formed to be capable of restricting relative displacement of the insert members with respect to the protrusions in the front-back directions and the left-right directions when the first insertion holes receive the protrusions, and wherein, when the second insertion holes receive the protrusions, play in the front-back directions is formed between the second insertion holes and the protrusions.

9. The vehicle seat according to claim 8, wherein the second insertion holes are formed to be capable of restricting relative displacement of the insert members with respect to the protrusions in the left-right directions when the second insertion holes receive the protrusions.

10. The vehicle seat according to claim 9, wherein each of the insert members includes a third leg portion that is formed on a forward side with respect to a corresponding one of the second leg portions, the third leg portions extending toward the inner sides of the support frames in the left-right directions, and wherein the second insertion holes are formed at positions where the second insertion holes are disposed side by side with the third leg portions in the left-right directions.

11. The vehicle seat according to claim 1, wherein, when the vehicle seat is installed in a vehicle, one of the side portions is disposed adjacent to a doorway of the vehicle, and wherein only the insert member at the side portion adjacent to the doorway is provided with the second leg portion.

12. The vehicle seat according to claim 1, wherein side surfaces of the insert members that face inner sides in the left-right directions each have an inclined surface, the inclined surfaces being inclined downward toward the inner sides of the support frames in the left-right directions from an upper end side to a lower end side thereof, and wherein the inclined surfaces have curved shapes that are recessed toward the outer sides of the support frames in the left-right directions.

13. The vehicle seat according to claim 12, wherein each of the insert members includes a third leg portion that is formed on a forward side with respect to a corresponding one of the second leg portions, the third leg portions extending toward the inner sides of the support frames in the left-right directions, and wherein each of the inclined surfaces extends in the front-back directions from a region where a corresponding one of the first leg portions is formed to a region where a corresponding one of the third leg portions is formed.

14. The vehicle seat according to claim 1, wherein each of the second leg portions extends on a forward side with respect to a corresponding one of the first leg portions, and wherein each of the insert members includes a third leg portion that is formed on a forward side with respect to a corresponding one of the second leg portions, the third leg portions extending toward the inner sides of the support frames in the left-right directions.

15. The vehicle seat according to claim 1, wherein hardnesses of the side portions are higher than a hardness of the main portion.

16. A vehicle comprising:

the vehicle seat according to claim 1 that is installed in the vehicle.

* * * * *